Patented Apr. 13, 1943

2,316,154

UNITED STATES PATENT OFFICE 2,316,154

NITRITE COMPOSITION

Francis S. Chambers, Jr., Woodbury, N. J., assignor to E. I. du Pont de Nemours & Company, Wilmington, Del., a corporation of Delaware No Drawing. Application October 16, 1941, Serial No. 415,211

5 Claims. (Cl. 23—104)

This invention relates to a nitrite composition of such a nature as to have increased resistance to setting, and to a method of preparing such a composition.

The most important of the nitrites industrially is the sodium salt, which is used in large quantities in a number of processes and industries. It is employed, for example, in the manufacture of dyes, in meat curing, and as an ingredient of heat transfer media. In connection with its various uses, it is frequently necessary to ship the material considerable distances from the place of manufacture to the place of use. It is important that the sodium nitrite received be in a condition convenient for handling and proportioning and that it be in granular condition. The ordinary sodium nitrite, however, has a tendency to set or to become hard-caked in storage or during transportation, particularly under the influence of small amounts of moisture. While anti-setting agents have been proposed in the past for various water-soluble salts, none of the conventional agents would function satisfactorily in the case of sodium nitrite because of the requirements for high nitrite content and freedom from objectionable or insoluble impurities. Any method that would produce a sodium nitrite product of greatly increased resistance to setting and that would, at the same time, add no material which would interfere with or diminish the planned functioning of the sodium nitrite, would constitute a decided advance in the art. While sodium nitrite is the most important of the nitrites industrially, the same advantages would be desirable in the case of potassium nitrite.

An object of the present invention is a sodium nitrite or potassium nitrite of enhanced resistance to setting and caking on storage. A further object is such a product wherein the improvement has involved introduction of no objectionable ingredient having a diluting or retarding effect. A still further object is a method for producing a product of the above description. Additional objects will be disclosed as the invention is described more in detail hereinafter.

I have found that the foregoing objects are accomplished when I add to sodium or potassium nitrite, in granular form, a small amount of an inorganic nitrite of a metal of group II of the periodic system. As examples of suitable nitrites for this purpose, I may cite the nitrites of calcium, strontium, barium, magnesium, zinc, and cadmium. Preferably this added nitrite will be present as a dusted coating on the dry sodium nitrite granules. I find it desirable to use such nitrite coating in an amount between 1 and 7% of the entire composition and preferably between 3 and 5%. The nitrites mentioned above all have the ability to form hydrated salts, and presumably this ability to accept water makes them desirable anti-setting agents under the circumstances.

In preparing such mixtures of sodium nitrite with a small amount of dry calcium nitrite powder or similar material, the sodium nitrite will desirably be in the form of distinct granules, for example of such a degree of fineness that the major portion will pass a 20-mesh screen, while less than 20% will pass a 100-mesh screen. The calcium nitrite, on the other hand, would preferably be of a greater degree of fineness, such for example, that more than 50% of it would pass a 100-mesh screen. I do not intend, however, to be limited to any definite degree of fineness of either the sodium or the calcium nitrites except that both should be in a granular state at the time of mixture. The smaller amount of calcium nitrite will tend to coat the sodium nitrite grains as a fine dry dust and protect the latter from adverse moisture effects.

As a specific example of the protecting effect of calcium nitrite in small amounts on sodium nitrite, about 10 grams of finely divided calcium nitrite was added to approximately 190 grams of sodium nitrite and the mixture was agitated vigorously. The sodium nitrite granules, in this case, were of such size that substantially all would pass a 20-mesh screen, while more than 50% was held on a 100-mesh screen. The calcium nitrite particles, on the other hand, were sufficiently fine so that more than 50% passed a 100-mesh screen. The blend of nitrites was stored in a glass bottle in which the salt mixture occupied not more than ⅓ the volume. After standing in ordinary atmospheres for nearly 3 years, the material remained entirely free-flowing, whereas untreated sodium nitrite became hard and set after a relatively short period of storage.

The protecting effect of calcium nitrite and other inorganic nitrites possessing the ability to form hydrated salts is very surprising, inasmuch as the purpose of its use is to protect against setting, which is ordinarily considered to be promoted by the presence of moisture, which causes the recrystallization of soluble salt, thereby introducing a cementing effect. Ordinarily, the anti-setting agents used with soluble salts are materials of a relatively low degree of solubility and, in many cases, are inert materials, for example, kieselguhr. It is postulated that the greater affinity for water of the nitrites of group II of the periodic system causes the water to be held by the nitrite coating rather than to be attracted to the sodium nitrite. I do not intend, however, to be limited in any way by this explanation of the protective action. It will be understood, however, that the use of a nitrite preferably the calcium salt, which has the lowest combining weight with sodium nitrite, is very advantageous, as compared with other anti-setting agents, in that its addition does not lessen the nitrite content materially. In the use of sodium nitrite in the preparation of dyes and in meat curing, as well as in other applications, it is the nitrite ion that gives the desired action. Hence, calcium nitrite would behave in a manner altogether similar to sodium nitrite, without the introduction of any objectionable impurity.

The utility of the present invention will be understood when it is realized that sodium nitrite, in set condition, can be broken up only by severe blows, and then only into chunks rather than grains. Grinding would be necessary, in many cases, to give a free-flowing product that could be utilized satisfactorily for purposes such as meat curing and the like.

It has been stated that the nitrites, which have a protective action according to the present invention, are capable of forming hydrated salts. Calcium nitrite, for example, adds water to form at least two hydrates, $Ca(NO_2)_2H_2O$ and $Ca(NO_2)_2 4H_2O$. Likewise, barium, strontium, magnesium, zinc, and cadmium form hydrated nitrite salts.

My invention has been described at length in the foregoing, but it will be understood that many variations in details, compositions and amounts may be introduced without departure from the scope of the invention. I intend to be limited therefore only by the following patent claims:

I claim:

1. A nitrite composition comprising a nitrite of one of the group of elements consisting of sodium and potassium, together with an amount between 1 and 7% of a nitrite of a metal of group II of the periodic system, the latter being present as a dry dusty coating on the dry particles of the former.

2. A nitrite composition comprising a nitrite of one of the group of elements consisting of sodium and potassium, said nitrite being coated with a nitrite of a metal of group II of the periodic system, the latter being present as a dry dusty coating on the dry particles of the former.

3. A nitrite composition of improved storage characteristics comprising sodium nitrite granules coated with between 1 and 7% of a nitrite of a metal taken from the group comprising calcium, strontium, barium, magnesium, and zinc, the latter being present as a dry dusty coating on the dry particles of the former.

4. A nitrite composition comprising sodium nitrite granules dusted with between 3 and 5% of finely divided calcium nitrite powder.

5. The method of protecting sodium nitrite from the tendency to set on storage, which comprises coating sodium nitrite granules with finely divided calcium nitrite in an amount between 1 and 7% of the entire composition.

FRANCIS S. CHAMBERS, Jr.